US012670852B2

(12) United States Patent
Sung et al.

(10) Patent No.: US 12,670,852 B2
(45) Date of Patent: Jun. 30, 2026

(54) DISPLAY DEVICE AND METHOD OF OPERATION THEREOF

(71) Applicant: Samsung Display Co., Ltd., Yongin-Si (KR)

(72) Inventors: Kihyun Sung, Yongin-si (KR); Hyun-Sik Yoon, Yongin-si (KR); Jongwoon Kim, Yongin-si (KR); Kihong Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/097,512

(22) Filed: Jan. 17, 2023

(65) Prior Publication Data

US 2023/0343284 A1 Oct. 26, 2023

(30) Foreign Application Priority Data

Apr. 21, 2022 (KR) ........................ 10-2022-0049709

(51) Int. Cl.

*G09G 3/3225* (2016.01)
*G09G 3/32* (2016.01)
*G09G 3/3233* (2016.01)
*G09G 3/3291* (2016.01)

(52) U.S. Cl.

CPC ............ *G09G 3/3225* (2013.01); *G09G 3/32* (2013.01); *G09G 3/3233* (2013.01); (Continued)

(58) Field of Classification Search

CPC .................. G09G 3/3225; G09G 3/32; G09G 2300/0842; G09G 2300/0852; (Continued)

(56) References Cited

U.S. PATENT DOCUMENTS 7,764,265 B2 * 7/2010 Ko ...................... G09G 3/3696 345/212
9,153,164 B2 10/2015 Lee
(Continued)

FOREIGN PATENT DOCUMENTS

KR 10-0797750 B1 1/2008
KR 10-1136277 B1 4/2012
(Continued)

*Primary Examiner* — William Boddie
*Assistant Examiner* — Saifeldin E Elnafia
(74) *Attorney, Agent, or Firm* — Innovation Counsel LLP

(57) ABSTRACT

A display device includes a display panel, a temperature sensor that detects an ambient temperature and outputs a first temperature signal corresponding to the detected ambient temperature, a memory that receives a memory power supply voltage and stores a compensation signal, a driving controller that receives the first temperature signal from the temperature sensor and an input image signal, and provides the display panel with an output image signal which is obtained by compensating for the input image signal based on the compensation signal from the memory, and a voltage generator that generates the memory power supply voltage in response to a voltage control signal from the driving controller. The driving controller outputs the voltage control signal such that the memory power supply voltage has a voltage level corresponding to the first temperature signal.

9 Claims, 7 Drawing Sheets

(52) U.S. Cl.
CPC ..... *G09G 3/3291* (2013.01); *G09G 2300/043* (2013.01); *G09G 2300/0842* (2013.01); *G09G 2300/0852* (2013.01); *G09G 2300/0866* (2013.01); *G09G 2310/0264* (2013.01); *G09G 2320/041* (2013.01); *G09G 2320/043* (2013.01); *G09G 2330/028* (2013.01)

(58) Field of Classification Search
CPC ..... G09G 2300/0866; G09G 2320/041; G09G 3/3233; G09G 3/3291; G09G 2300/043; G09G 2310/0264; G09G 2320/043; G09G 2330/028; G11C 7/04
See application file for complete search history.

(56) References Cited

U.S. PATENT DOCUMENTS

| | | | | |
|---|---|---|---|---|
| 9,691,353 | B2 | 6/2017 | Joo et al. | |
| 2004/0041762 | A1 * | 3/2004 | Naiki | H02M 3/073 345/87 |
| 2005/0190171 | A1 * | 9/2005 | Jang | G09G 3/3406 345/204 |
| 2007/0085803 | A1 * | 4/2007 | Chu | G09G 3/3674 345/98 |
| 2009/0043521 | A1 * | 2/2009 | Lin | G01K 7/01 702/136 |
| 2009/0184901 | A1 * | 7/2009 | Kwon | G09G 3/3233 345/77 |
| 2014/0104259 | A1 * | 4/2014 | Oh | G09G 3/3266 345/212 |
| 2016/0217731 | A1 | 7/2016 | Joo et al. | |
| 2018/0246662 | A1 * | 8/2018 | Kim | G06F 3/0679 |
| 2023/0178037 | A1 * | 6/2023 | Chen | G09G 3/3406 345/55 |

FOREIGN PATENT DOCUMENTS

| | | | |
|---|---|---|---|
| KR | 10-1258083 | B1 | 4/2013 |
| KR | 10-2014-0078919 | A | 6/2014 |
| KR | 10-2016-0092537 | A | 8/2016 |
| KR | 10-2288334 | B1 | 8/2021 |

* cited by examiner

DISPLAY DEVICE AND METHOD OF OPERATION THEREOF

CROSS-REFERENCE TO RELATED APPLICATIONS

This application claims priority under 35 U.S.C. § 119 to Korean Patent Application No. 10-2022-0049709 filed on Apr. 21, 2022, in the Korean Intellectual Property Office, the disclosures of which are incorporated by reference herein in their entireties.

BACKGROUND

Embodiments of the present disclosure described herein relate to a display device.

Electronic devices, which provide images to a user, such as a smart phone, a digital camera, a notebook computer, a navigation system, a monitor, and a smart television include a display device for displaying the images. The display device generates an image and provides the user with the generated image through a display screen.

The display device includes a plurality of pixels and driving circuits for controlling the plurality of pixels. Each of the plurality of pixels includes a light emitting element and a pixel circuit for controlling the light emitting element. The pixel circuit may include a plurality of transistors organically connected to one another.

This display device may display an image by outputting a plurality of scan signals to scan lines connected to the plurality of pixels and providing a plurality of data lines connected to the plurality of pixels with data voltages corresponding to the image to be displayed.

SUMMARY

Embodiments of the present disclosure provide a display device capable of stably operating irrespective of ambient temperature, and a voltage control method thereof.

According to an embodiment, a display device includes a display panel, a temperature sensor that detects an ambient temperature and outputs a first temperature signal corresponding to the detected ambient temperature, a memory that receives a memory power supply voltage and stores a compensation signal, a driving controller that receives the first temperature signal from the temperature sensor and an input image signal, and provides the display panel with an output image signal which is obtained by compensating for the input image signal based on the compensation signal from the memory, and a voltage generator that generates the memory power supply voltage in response to a voltage control signal from the driving controller. The driving controller outputs the voltage control signal such that the memory power supply voltage has a voltage level corresponding to the first temperature signal.

In an embodiment, the driving controller may output the voltage control signal such that the memory power supply voltage has a first voltage level when the first temperature signal is higher than a reference temperature, and may output the voltage control signal such that the memory power supply voltage has a second voltage level different from the first voltage level when the first temperature signal is lower than or equal to the reference temperature.

In an embodiment, the second voltage level may be higher than the first voltage level.

In an embodiment, the second voltage level may be higher than the first voltage level by 5%.

In an embodiment, the display device may further include a temperature calculator that calculates the ambient temperature and outputs a second temperature signal corresponding to the calculated ambient temperature. The driving controller may output the voltage control signal based on the first temperature signal and the second temperature signal.

In an embodiment, the driving controller may output the voltage control signal based on a temperature signal which indicates a lower temperature, from among the first temperature signal and the second temperature signal.

In an embodiment, the display panel may include a pixel. The pixel may include a transistor and a light emitting element electrically connected to the transistor.

In an embodiment, the compensation signal may include deterioration information of the transistor and the light emitting element.

According to an embodiment, a display device includes a display panel, a main circuit board electrically connected to the display panel, and a driving circuit disposed on the main circuit board and providing an output image signal to the display panel. The driving circuit includes a temperature sensor that detects an ambient temperature and outputs a first temperature signal corresponding to the detected ambient temperature, a memory that receives a memory power supply voltage and stores a compensation signal, a driving controller that receives the first temperature signal from the temperature sensor and an input image signal, and outputs the output image signal to the display panel which is obtained by compensating for the input image signal based on the compensation signal from the memory, and a voltage generator that generates the memory power supply voltage in response to a voltage control signal from the driving controller. The driving controller outputs the voltage control signal such that the memory power supply voltage has a voltage level corresponding to the first temperature signal.

In an embodiment, the driving controller may output the voltage control signal such that the memory power supply voltage has a first voltage level when the first temperature signal is higher than a reference temperature, and may output the voltage control signal such that the memory power supply voltage has a second voltage level different from the first voltage level when the first temperature signal is lower than or equal to the reference temperature.

In an embodiment, the second voltage level may be higher than the first voltage level.

In an embodiment, the second voltage level may be higher than the first voltage level by 5%.

In an embodiment, the display device may further include a temperature calculator that calculates the ambient temperature and outputs a second temperature signal corresponding to the calculated ambient temperature. The driving controller may output the voltage control signal based on the first temperature signal and the second temperature signal.

In an embodiment, the display panel may include a pixel. The pixel may include a light emitting element including a first terminal and a second terminal and a transistor connected between a first voltage line and the first terminal of the light emitting element.

In an embodiment, the compensation signal may include deterioration information of the transistor and the light emitting element.

In an embodiment, the voltage generator may further generate a first driving voltage provided to the first voltage line and a second driving voltage provided to the second terminal of the light emitting element.

According to an embodiment, an operating method of a display device includes detecting an ambient temperature, comparing the ambient temperature with a reference temperature, generating a memory power supply voltage having a voltage level corresponding to the comparison result between the ambient temperature and the reference temperature, providing the memory power supply voltage to a memory, generating a compensation signal from the memory, and providing a display panel with an output image signal obtained by compensating for an input image signal based on the compensation signal.

In an embodiment, the generating of the memory power supply voltage includes outputting a voltage control signal of a first level when the ambient temperature is higher than the reference temperature, and outputting a first memory power supply voltage of a first voltage level in response to the voltage control signal of the first level.

In an embodiment, the operating method of the display device may further include outputting the voltage control signal of a second level when the ambient temperature is lower than or equal to the reference temperature, and outputting the first memory power supply voltage of a second voltage level different from the first voltage level in response to the voltage control signal of the second level.

In an embodiment, the second voltage level may be higher than the first voltage level.

In an embodiment, the second voltage level may be higher than the first voltage level by 5%.

In an embodiment, the display panel may include a pixel. The pixel may include a light emitting element including a first terminal and a second terminal and a transistor connected between a first voltage line and the first terminal of the light emitting element.

In an embodiment, the compensation signal may include deterioration information of the transistor and the light emitting element.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
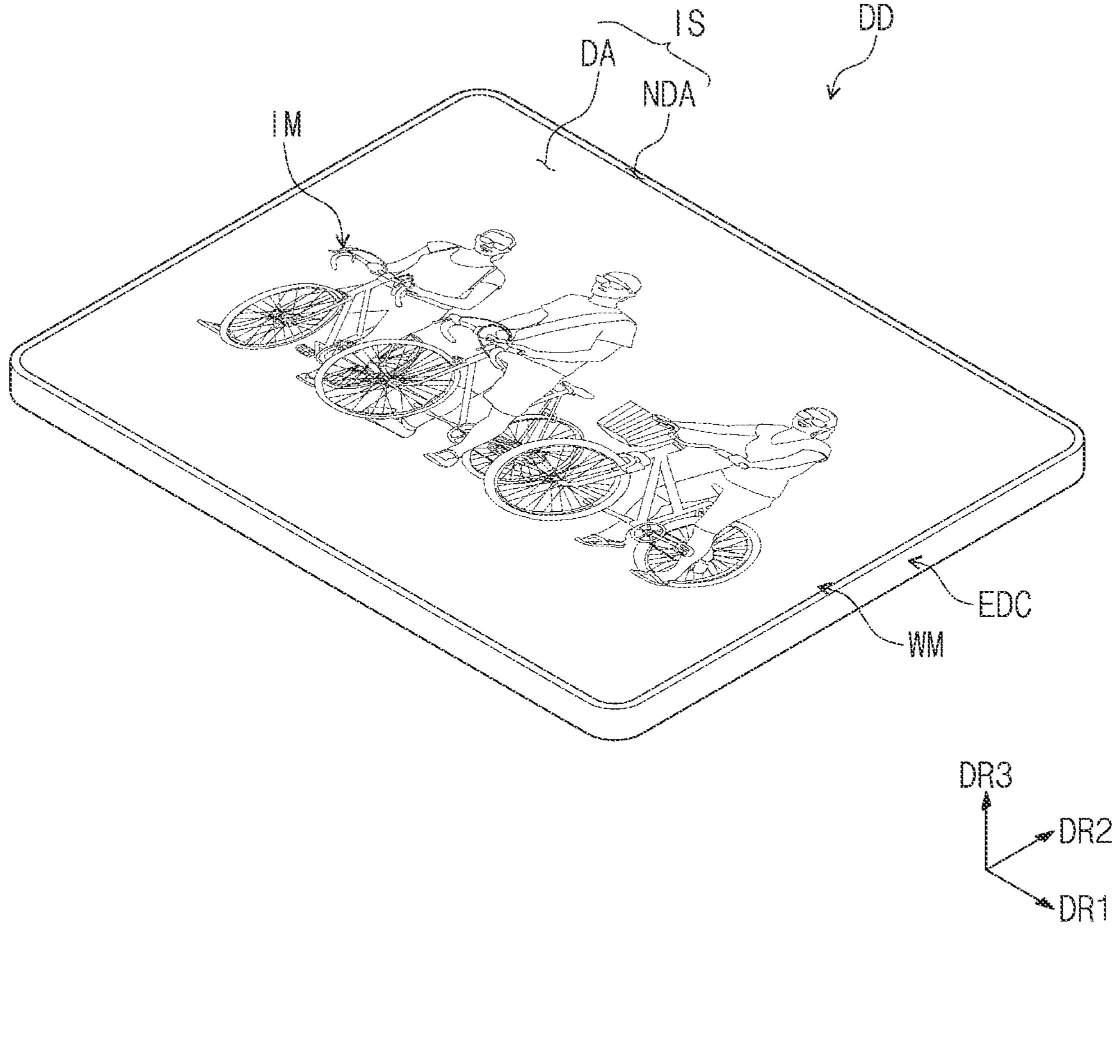
FIG. 1 is a perspective view of a display device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
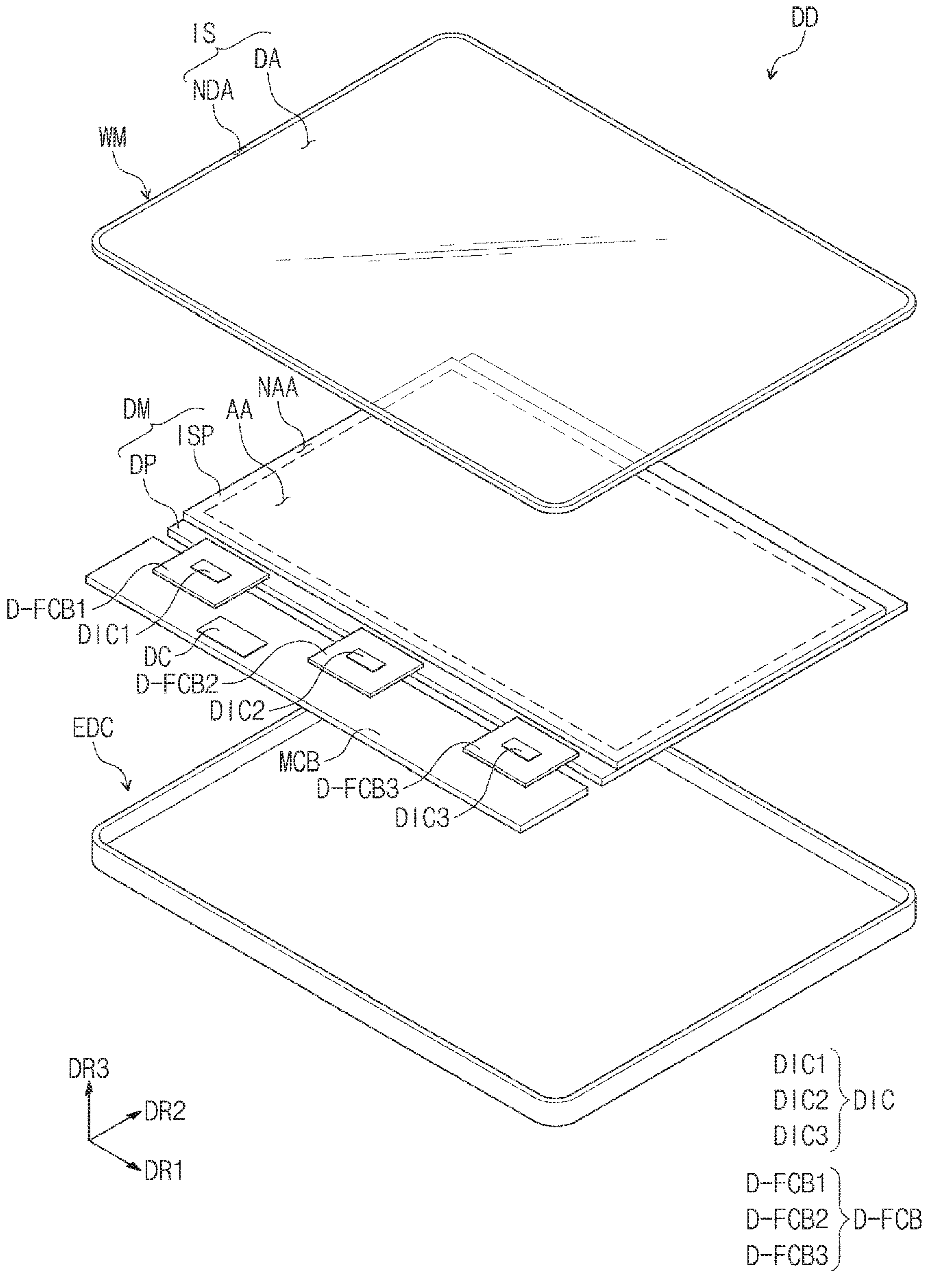
FIG. 2 is an exploded perspective view of a display device according to an embodiment of the present disclosure.

FIG. 1 is a perspective view of a display device according to an embodiment of the present disclosure. FIG. 2 is an exploded perspective view of a display device according to an embodiment of the present disclosure.

Referring to FIGS. 1 and 2, a display device DD may be a device activated in response to an electrical signal. The display device DD according to the present disclosure may be a small and medium-sized electronic device such as a mobile phone, a tablet PC, a notebook computer, a vehicle navigation system, or a game console, as well as a large-sized electronic device such as a television or a monitor. The above examples are provided only as examples, and it is obvious that the display device DD may be applied to any other display device(s) without departing from the concept of the present disclosure. The display device DD is in a shape of a rectangle having a long side in a first direction DR1 and a short side in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user which is applied from the outside. The external input of the user may be one of various types of external inputs such as a part of his/her body, light, heat, his/her gaze, and pressure, or a combination thereof. Also, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may include a display area DA and a non-display area NDA. The display area DA may be an area in which the image IM is displayed. The user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is disposed adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot, a quantum rod, or the like. Hereinafter, in an embodiment, the description will be given under the condition that the display panel DP is an organic light emitting display panel.

The display panel DP may output the image IM and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. In an embodiment, the inner adhesive film may be interposed between the input sensing layer ISP and the display panel DP. In this case, the input sensing layer ISP is not manufactured directly on the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, an embodiment is not limited thereto. For example, the window WM may include a plurality of layers.

In an embodiment, the window WM may include a light blocking pattern for defining the non-display area NDA. The light blocking pattern that is a colored organic film may be formed, for example, through a coating process.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further interposed between the window WM and the display module DM. The anti-reflection layer decreases the reflectivity of external light incident from above the window WM. The anti-reflection layer according to an embodiment of the present disclosure may include a retarder and a polarizer. The retarder may have a film type or a liquid crystal coating type. The polarizer may also be a polarizer of a film type or a liquid crystal coating type. The film type may include a stretch-type synthetic resin film and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. Also, the anti-reflection layer may further include a light blocking pattern.

The display module DM may display the image IM in response to an electrical signal and may transmit/receive information about an external input. The display module DM may include an active area AA and an inactive area NAA. The active area AA may be an area through which the image IM provided from the display area DA is output. Also, the active area AA may be an area in which the input sensing layer ISP senses an external input applied from the outside.

The inactive area NAA is disposed adjacent to the active area AA. For example, the inactive area NAA may surround the active area AA. However, this is illustrated by way of example. The inactive area NAA may have various shapes, not limited to an embodiment. According to an embodiment, the active area AA of the display module DM may correspond to at least part of the display area DA.

The display module DM may further include a main circuit board MCB, flexible circuit films D-FCB, and driver chips DIC. The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB.

The display module DM may include a driving circuit DC disposed on the main circuit board MCB. The driving circuit DC may include circuits for driving the display panel DP. The driver chips DIC may be mounted on the flexible circuit films D-FCB, respectively. In an embodiment, the driving circuit DC may include a driving controller for driving the driving chips DIC and a voltage generator that generates voltages necessary for an operation of the display panel DP.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, an embodiment of the present disclosure is not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected to the main circuit board MCB through the flexible circuit films D-FCB. However, an embodiment of the present disclosure is not limited thereto. That is, the display module DM may additionally include a separate flexible circuit film for electrically connecting the input sensing layer ISP and the main circuit board MCB.

The display device DD further includes an outer case EDC accommodating the display module DM. The outer case EDC may be coupled with the window WM to form the exterior of the display device DD. The outer case EDC may absorb external shocks and may prevent a foreign material/moisture or the like from being infiltrated into the display module DM such that components accommodated in the outer case EDC are protected. Meanwhile, as an example of the present disclosure, the outer case EDC may be provided in the form of a combination of a plurality of accommodating members.

The display device DD according to an embodiment may further include an electronic module including various functional modules for operating the display module DM, a power supply module (e.g., a battery) for supplying a power necessary for overall operations of the display device DD, a bracket coupled with the display module DM and/or the outer case EDC to partition an inner space of the display device DD, etc.

Figure 3:
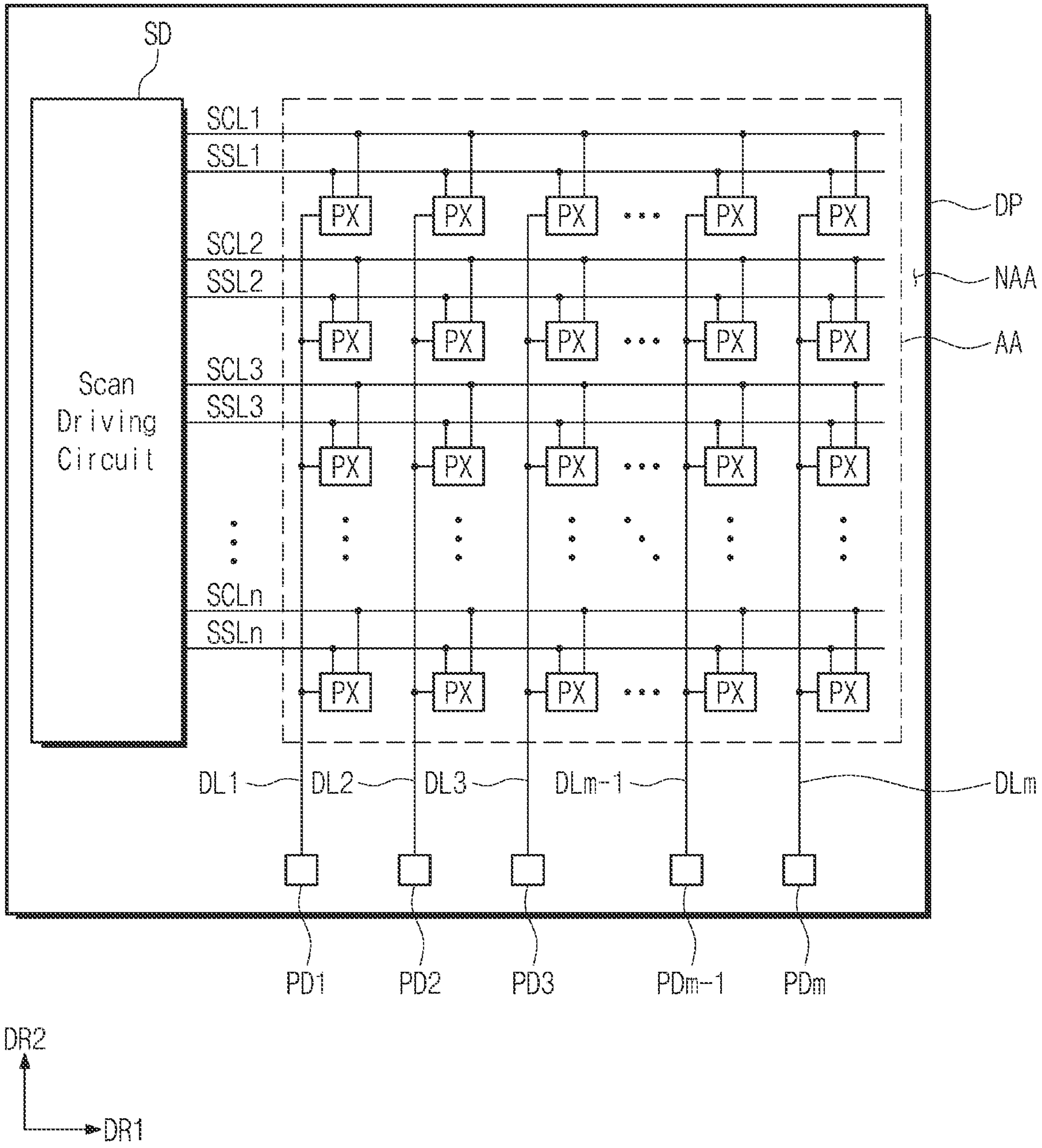
FIG. 3 is a block diagram of a display panel according to an embodiment of the present disclosure.

FIG. 3 is a block diagram of a display panel, according to an embodiment of the present disclosure.

Referring to FIG. 3, the display panel DP includes first scan lines SCL1 to SCLn, second scan lines SSL1 to SSLn, the data lines DL1 to DLm, and pixels PX. The display panel DP may further include a scan driving circuit SD. In an embodiment, the scan driving circuit SD is arranged on a first side of the display panel DP. The first scan lines SCL1 to SCLn and the second scan lines SSL1 to SSLn extend in the first direction DR1 from the scan driving circuit SD.

The scan driving circuit SD may provide first scan signals and second scan signals to the first scan lines SCL1 to SCLn and the second scan lines SSL1 to SSLn of the display panel DP, respectively.

The display panel DP may include the active area AA and the inactive area NAA. The pixels PX may be positioned in the active area AA. The scan driving circuit SD may be positioned in the inactive area NAA.

The first scan lines SCL1 to SCLn and the second scan lines SSL1 to SSLn are positioned spaced from each other in the second direction DR2. The data lines DL1 to DLm extend in the second direction DR2 and are arranged spaced from one another in the first direction DR1.

The plurality of pixels PX are electrically connected to the first scan lines SCL1 to SCLn, the second scan lines SSL1 to SSLn, and the data lines DL1 to DLm, respectively. For example, the first row of pixels PX may be connected to the first scan line SCL1 and the second scan line SSL1. Moreover, the second row of pixels PX may be connected to the first scan line SCL2 and the second scan line SSL2.

Each of the plurality of pixels PX includes a light emitting element ED (see FIG. 4) and a pixel circuit PXC (see FIG. 4) for controlling the light emission of the light emitting element ED. The pixel circuit PXC may include a plurality of transistors and at least one capacitor. The scan driving circuit SD may include transistors formed through the same process as the pixel circuit PXC. In an embodiment, the light emitting element ED may be an organic light emitting diode. However, the present disclosure is not limited thereto.

In an embodiment, the scan driving circuit SD is disposed on a first side of the display area DA, but the present disclosure is not limited thereto. In an embodiment, the scan driving circuit SD may be disposed not only on the first side of the active area AA but also on a second side facing the first side.

The display panel DP may further include data pads PD1 to PDm. The data pads PD1 to PDm are electrically connected to the data lines DL1 to DLm, respectively. The data pads PD1 to PDm may be electrically connected to the flexible circuit films D-FCB shown in FIG. 2.

Figure 4:
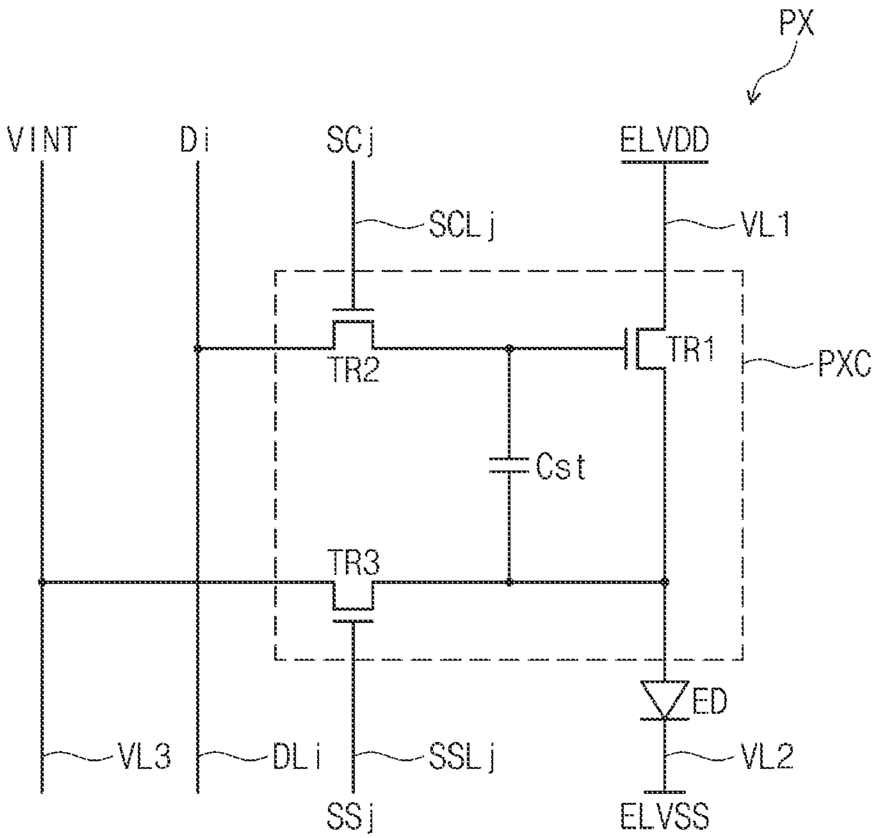
FIG. 4 is a circuit diagram of a pixel according to an embodiment of the present disclosure.

FIG. 4 is a circuit diagram of a pixel, according to an embodiment of the present disclosure.

FIG. 4 illustrates an equivalent circuit diagram of a pixel PX connected to an i-th data line DLi among the data lines DL1 to DLm, a j-th first scan line SCLj among the first scan lines SCL1 to SCLn, and a j-th second scan line SSLj among the second scan lines SSL1 to SSLn, which are illustrated in FIG. 1.

Each of the plurality of pixels PX shown in FIG. 3 may have the same circuit configuration as the pixel PX shown in FIG. 4. In an embodiment, the pixel PX includes the at least one light emitting element ED and the pixel circuit PXC.

The pixel circuit PXC may include at least one transistor which is electrically connected to the light emitting element ED and which is used to provide a current corresponding to the data signal Di delivered from the data line DLi to the light emitting element ED. In an embodiment, the pixel circuit PXC of the pixel PX includes a first transistor TR1, a second transistor TR2, a third transistor TR3, and a capacitor Cst. Each of the first to third transistors TR1 to TR3 is an N-type transistor by using an oxide semiconductor as a semiconductor layer. However, the present disclosure is not limited thereto. For example, each of the first to third transistors TR1 to TR3 may be a P-type transistor having a low-temperature polycrystalline silicon (LTPS) semiconductor layer. In an embodiment, at least one of the first to third transistors TR1 to TR3 may be an N-type transistor and the others thereof may be P-type transistors. Moreover, the circuit configuration of a pixel according to an embodiment of the present disclosure is not limited to FIG. 4. The pixel circuit PXC illustrated in FIG. 4 is only an example. For example, the configuration of the pixel circuit PXC may be modified as needed.

Referring to FIG. 4, the first scan line SCLj may deliver the first scan signal SCj, and the second scan line SSLj may deliver the second scan signal SSj. The data line DLi transfers a data signal Di.

A first driving voltage ELVDD and an initialization voltage VINT may be delivered to the pixel circuit PXC through the first voltage line VL1 and the third voltage line VL3, respectively. A second driving voltage ELVSS may be delivered to a cathode (or a second terminal) of the light emitting element ED through the second voltage line VL2.

The first transistor TR1 includes a first electrode (or a drain electrode) connected to the first voltage line VL1, a second electrode (or a source electrode) electrically connected to an anode (or a first terminal) of the light emitting element ED, and a gate electrode connected to one end of the capacitor Cst.

The second transistor TR2 includes a first electrode connected to the data line DLi, a second electrode connected to the gate electrode of the first transistor TR1, and a gate electrode connected to the first scan line SCLj. The second transistor TR2 may be turned on in response to a first scan signal SCj received through the first scan line SCLj so as to deliver the data signal Di delivered through the data line DLi to the gate electrode of the first transistor TR1. When the second transistor TR2 is turned on, the first transistor TR1 may supply a driving current to the light emitting element ED in response to the data signal Di delivered through the data line DLi.

The third transistor TR3 includes a first electrode connected to the third voltage line VL3, a second electrode connected to the anode of the light emitting element ED, and a gate electrode connected to the second scan line SSLj. The third transistor TR3 may be turned on in response to a second scan signal SSj received through the second scan line SSLj so as to deliver the initialization voltage VINT to the anode of the light emitting element ED.

As described above, one end of the capacitor Cst is connected to the gate electrode of the first transistor TR1 and the other end of the capacitor Cst is connected to the second electrode of the first transistor TR1. The structure of the pixel PX according to an embodiment is not limited to the structure illustrated in FIG. 4. The number of transistors in the pixel PX included in the pixel circuit PXC, the number of capacitors included therein, and the connection relationship may be modified in various manners.

Figure 5:
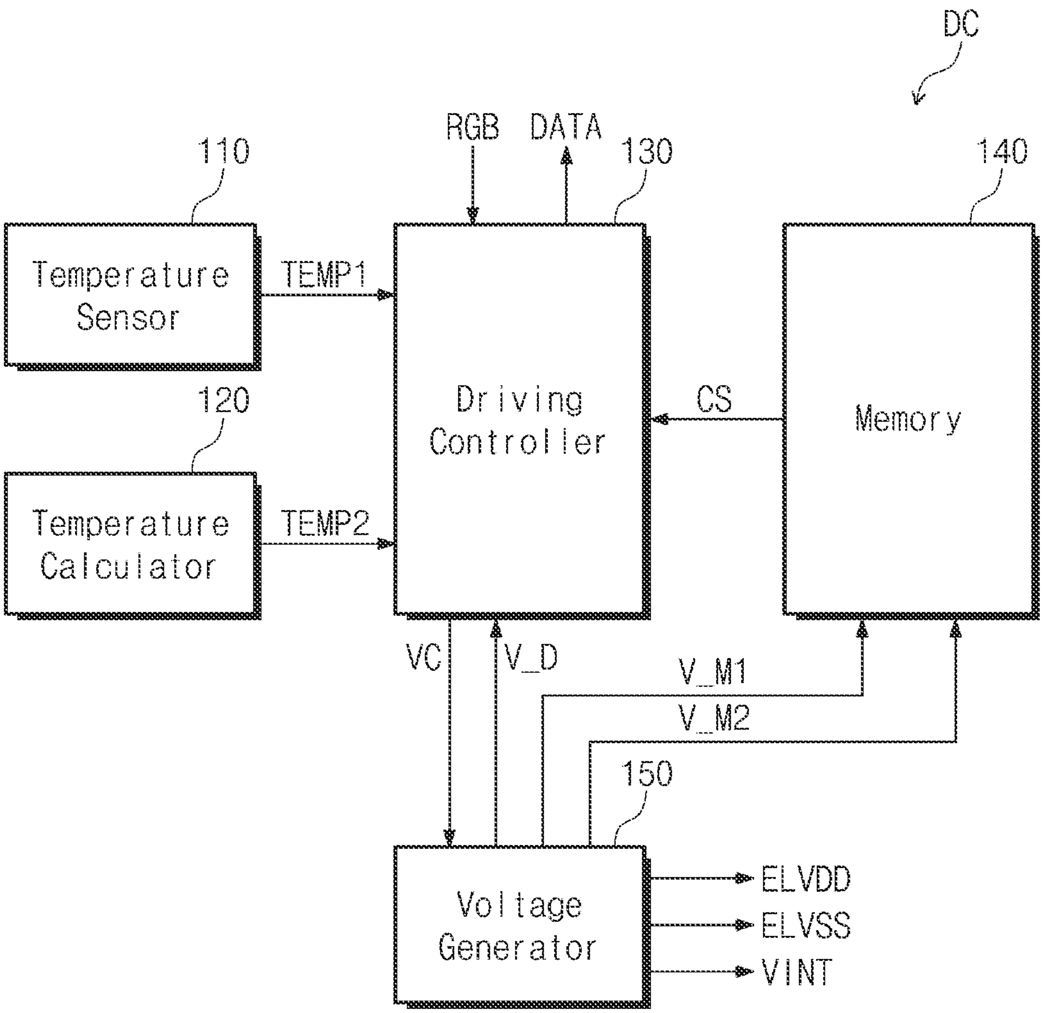
FIG. 5 is a block diagram of a driving circuit according to an embodiment of the present disclosure.

FIG. 5 is a block diagram of a driving circuit, according to an embodiment of the present disclosure.

Referring to FIG. 5, the driving circuit DC includes a temperature sensor 110, a temperature calculator 120, a driving controller 130, a memory 140, and a voltage generator 150.

The temperature sensor 110 detects an ambient temperature and outputs a first temperature signal TEMP1 corresponding to the detected ambient temperature.

The temperature calculator 120 calculates the ambient temperature and outputs a second temperature signal TEMP2 corresponding to the calculated ambient temperature. In an embodiment, the temperature calculator 120 may include a transistor of which the threshold voltage changes depending on the ambient temperature. When the threshold voltage of the transistor changes according to the ambient temperature, the temperature calculator 120 may detect the amount of current flowing through the transistor. Moreover, the temperature calculator 120 may output the second temperature signal TEMP2 corresponding to the amount of detected current, the power consumption of the display device DD, and the operating time of the display device DD.

The memory 140 stores compensation information according to characteristics of the plurality of pixels PX (see FIG. 4). The first transistor TR1 in each of the plurality of pixels PX provides the light emitting element ED with a current corresponding to the data signal Di delivered through the data line DLi. The current driving ability of the first transistor TR1 depends on a threshold voltage. The threshold voltage of the first transistor TR1 may be different for each of the plurality of pixels PX due to a distribution in a manufacturing process of the plurality of pixels PX. Besides, the threshold voltage of the first transistor TR1 may change depending on the operating time. In the meantime, characteristics of the light emitting element ED may change depending on the operating time.

The memory 140 may store initial characteristics and deterioration information of each of the plurality of first transistors TR1 and the light emitting elements ED.

In an embodiment, the memory 140 may be a double data rate synchronous dynamic random access memory (DDR SDRAM) or a low-power DDR SDRAM.

The driving controller 130 receives an input image signal RGB from an external processor (e.g., an application processor, a graphic processor, or a main processor). The driving controller 130 performs a compensation process on the input image signal RGB in response to a compensation signal CS received from the memory 140, and outputs an output image signal DATA to a display panel DP. The output image signal DATA may be provided to the display panel DP through the driving chips DIC shown in FIG. 2. The driving controller 130 may provide a voltage control signal VC to the voltage generator 150.

The driving controller 130 outputs the voltage control signal VC based on a temperature signal that includes the first temperature signal TEMP1 and the second temperature signal TEMP2. In an embodiment, the driving controller 130 may output the voltage control signal VC based on a temperature signal which corresponds to the lower temperature from among the first temperature signal TEMP1 and the second temperature signal TEMP2.

In an embodiment, when one of the temperature sensor 110 and the temperature calculator 120 is out of order, the driving controller 130 may output the voltage control signal VC based on a temperature signal from the other of the temperature sensor 110 and the temperature calculator 120 which operates normally.

In an embodiment, the display device DD may include only one of the temperature sensor 110 and the temperature calculator 120.

The voltage generator 150 may provide a driving power supply voltage V_D to the driving controller 130 in response to the voltage control signal VC and may provide the first memory power supply voltage V_M1 and the second memory power supply voltage V_M2 to the memory 140. The voltage generator 150 may generate various voltages necessary for an operation of the display device DD as well as the driving power supply voltage V_D, the first memory power supply voltage V_M1, and the second memory power supply voltage V_M2. In an embodiment, the voltage generator 150 may further generate the first driving voltage ELVDD, the second driving voltage ELVSS, and the initialization voltage VINT which are provided to the plurality of pixels PX illustrated in FIG. 4. The voltage generator 150 may further generate voltages of various voltage levels required by the memory 140.

In an embodiment, the first memory power supply voltage V_M1 may be a voltage required for operations of memory cells in the memory 140. In an embodiment, the second memory power supply voltage V_M2 may be a voltage required for the operation of an input/output buffer in the memory 140.

In an embodiment, the first memory power supply voltage V_M1 and the second memory power supply voltage V_M2 may be the same voltage levels as each other. In an embodiment, the first memory power supply voltage V_M1 and the second memory power supply voltage V_M2 may be different voltage levels from each other.

The voltage generator 150 may determine a voltage level of each of the first memory power supply voltage V_M1 and the second memory power supply voltage V_M2 in response to the voltage control signal VC.

Figure 6:
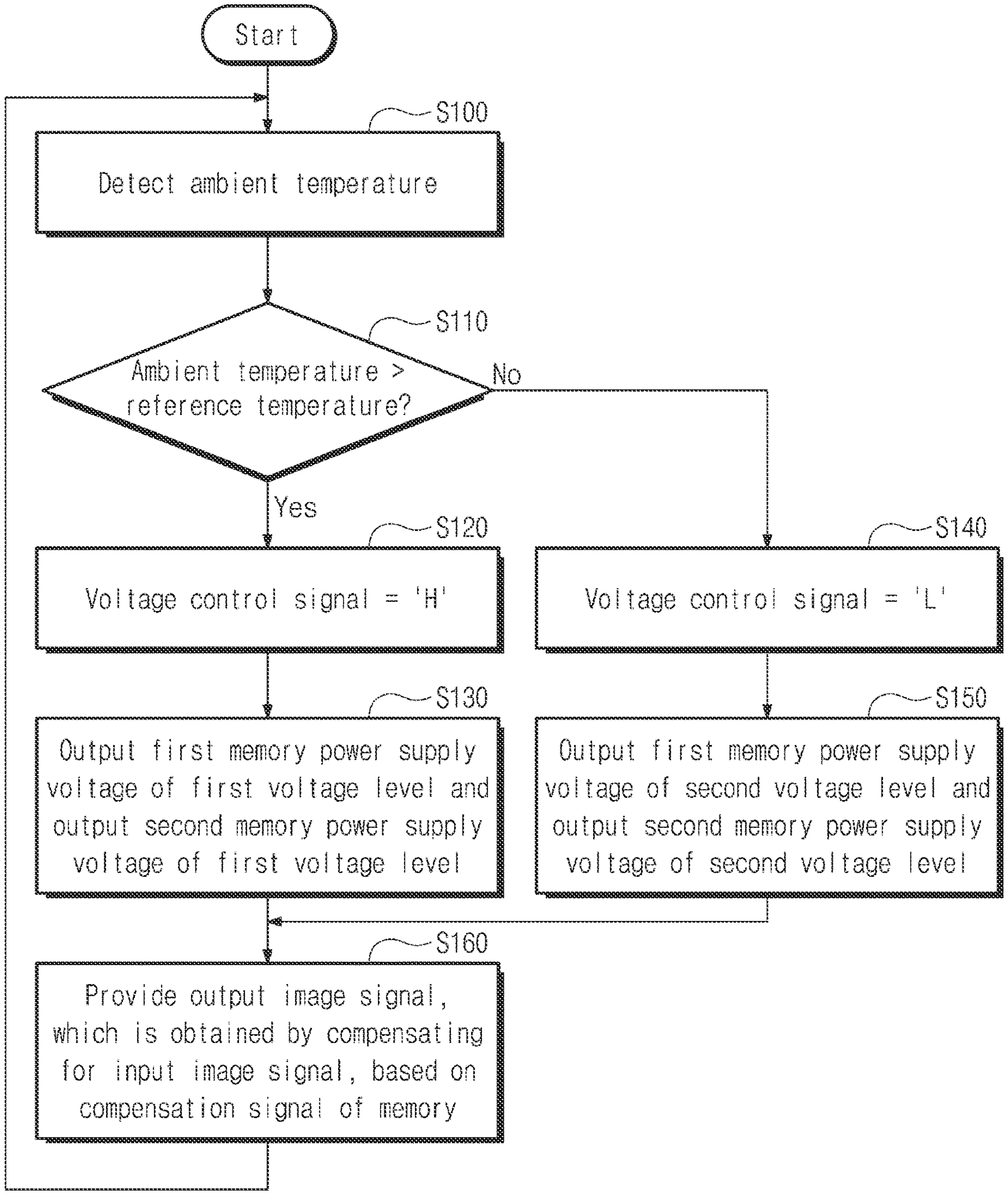
FIG. 6 is a flowchart for describing an operation of a driving circuit.

FIG. 6 is a flowchart for describing an operation of a driving circuit.

Referring to FIGS. 5 and 6, the temperature sensor 110 detects ambient temperature and the temperature calculator calculate the ambient temperature (operation S100). The temperature sensor 110 outputs the first temperature signal TEMP1 corresponding to the detected ambient temperature to the driving controller 130. The temperature calculator 120 outputs the second temperature signal TEMP2 corresponding to the calculated ambient temperature to the driving controller 130.

The driving controller 130 receives the first temperature signal TEMP1 and compares the ambient temperature indicated by the first temperature signal TEMP1 with a reference temperature and receives the second temperature signal TEMP2 and compares the ambient temperature indicated by the second temperature signal TEMP2 with a reference temperature (operation S110). The reference temperature may be a temperature that causes the malfunction of the memory 140. For example, when the memory 140 malfunctions at 0 degrees Celsius or less, the reference temperature may be 0 degrees Celsius.

When any one of the ambient temperature indicated by the first temperature signal TEMP1 and the second temperature signal TEMP2 is higher than the reference temperature, the driving controller 130 outputs the voltage control signal VC having a first level (e.g., a high level 'H' or '1') (operation S120).

The driving controller 130 may output the voltage control signal VC based on the ambient temperature indicated by the first temperature signal TEMP1 from the temperature sensor 110 as well as the second temperature signal TEMP2 from the temperature calculator 120.

When both the first temperature signal TEMP1 and the second temperature signal TEMP2 indicate that the ambient temperature is higher than the reference temperature (e.g., 0 degrees), the driving controller 130 may output the voltage control signal VC of a first level.

The voltage generator 150 outputs the first memory power supply voltage V_M1 of a first voltage level in response to the voltage control signal VC of the first level (operation S130). Furthermore, the voltage generator 150 may output the second memory power supply voltage V_M2 of a first voltage level in response to the voltage control signal VC of the first level.

When the ambient temperature is lower than or equal to the reference temperature, the driving controller 130 outputs the voltage control signal VC of a second level (e.g., a low level 'L' or '0') (operation S140).

When at least one of the first temperature signal TEMP1 and the second temperature signal TEMP2 indicates that the ambient temperature is lower than or equal to the reference temperature (e.g., 0 degrees), the driving controller 130 may output the voltage control signal VC of the second level.

The voltage generator 150 outputs the first memory power supply voltage V_M1 of a second voltage level in response to the voltage control signal VC of the second level (operation S150). In addition, the voltage generator 150 may output the second memory power supply voltage V_M2 of a second voltage level in response to the voltage control signal VC of the second level.

The second voltage level of each of the first memory power supply voltage V_M1 and the second memory power supply voltage V_M2 is higher than the first voltage level.

In an embodiment, the second voltage level may be a voltage level higher than the first voltage level by a predetermined ratio (e.g., 5%). For example, when the first voltage level of each of the first memory power supply voltage V_M1 and the second memory power supply voltage V_M2 is 1.1 V, the second voltage level may be 1.155 V, which is higher than 1.1 V by 5% The second voltage level may be set within a range suitable for the specification of the memory 140.

The driving controller 130 receives the compensation signal CS from the memory 140. The driving controller 130 may provide the output image signal DATA, which is obtained by compensating for the input image signal RGB, to the display panel DP based on the compensation signal CS (operation S160).

While the display device DD is in an operating state, the operations illustrated in FIG. 6 may be repeatedly performed. While the voltage level of each of the first memory power supply voltage V_M1 and the second memory power supply voltage V_M2 is maintained at the second voltage level because the ambient temperature is lower than the reference temperature of 0 degrees Celsius, when the ambient temperature increases to be higher than or equal to the reference temperature of 0 degrees Celsius, the driving controller 130 may output the voltage control signal VC of a first level (e.g., a high level 'H' or '1').

Figure 7:
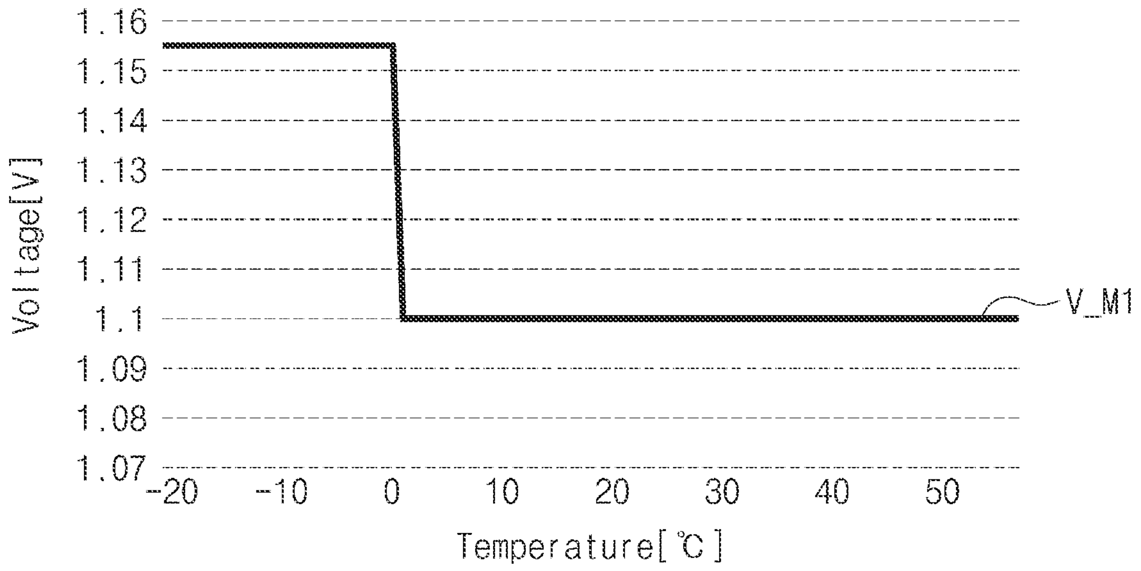
FIG. 7 is a diagram illustrating a voltage level of a first memory power supply voltage according to ambient temperature.

FIG. 7 is a diagram illustrating a voltage level of the first memory power supply voltage V_M1 according to ambient temperature.

Referring to FIGS. 5 and 7, when ambient temperature is higher than 0 degrees Celsius, the first memory power supply voltage V_M1 may be a first voltage level (e.g., 1.1 V).

When the ambient temperature is lower than or equal to 0 degrees Celsius, the first memory power supply voltage V_M1 may be a second voltage level (e.g., 1.155 V) that is higher than the first voltage level (e.g., 1.1 V) by 5%.

In a low-temperature environment, a voltage level of the compensation signal CS output from the memory 140 may be lowered. When the driving controller 130 does not normally receive the compensation signal CS, the driving controller 130 may not normally compensate for deterioration of the first transistor TR1 and/or the light emitting element ED in the plurality of pixels PX. In this case, a noise image may be displayed on the display panel DP.

When the ambient temperature is lower than or equal to 0 degrees Celsius that is the reference temperature, the voltage level of the first memory power supply voltage V_M1 is changed to a second level higher than a first level that is a normal level. As the first memory power supply voltage V_M1 increases, a stable operation of the memory 140 may be possible, and a voltage level of the compensation signal CS output from the memory 140 may be included within the normal range.

Accordingly, the display device DD may operate stably in the low-temperature environment.

The second voltage level of each of the first memory power supply voltage V_M1 and the second memory power supply voltage V_M2 may be set within a range suitable for the specification of the memory 140. Table 1 below shows voltage conditions of the first memory power supply voltage V_M1 and the second memory power supply voltage V_M2 of the memory 140.

TABLE 1

| | Minimum voltage | Normal voltage | Maximum voltage |
|---|---|---|---|
| First memory power supply voltage V_M1 | 1.06 V | 1.10 V | 1.17 V |
| Second memory power supply voltage V_M2 | 1.06 V | 1.10 V | 1.17 V |

When the ambient temperature is higher than the reference temperature of 0 degrees Celsius, a voltage level of each of the first memory power supply voltage V_M1 and the second memory power supply voltage V_M2 may be a normal level of 1.10 V. When the ambient temperature is lower than or equal to 0 degrees Celsius that is the reference temperature, the voltage level of each of the first memory power supply voltage V_M1 and the second memory power supply voltage V_M2 may be selected within a range higher than the normal level of 1.10 V and lower than the maximum voltage level of 1.17 V.

Although an embodiment of the present disclosure has been described for illustrative purposes, those skilled in the art will appreciate that various modifications, and substitutions are possible without departing from the scope and spirit of the present disclosure as disclosed in the accompanying claims. Accordingly, the technical scope of the present disclosure is not limited to the detailed description of this specification, but should be defined by the claims.

A display device having such a configuration may compensate for deterioration of a pixel based on a compensation signal stored in a memory. When an ambient temperature is lower than a reference temperature, the voltage level of the compensation signal output from the memory is lowered, and thus the display device is not capable of operating normally. When the ambient temperature is lower than the reference temperature, the display device may prevent malfunction due to an error in the compensation signal by raising the voltage level of the memory power supply voltage provided to the memory.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels;

a temperature sensor which detects an ambient temperature and outputs a first temperature signal corresponding to the detected ambient temperature;

a temperature calculator which calculates the ambient temperature using current flowing through a transistor included in the temperature calculator and outputs a second temperature signal corresponding to the calculated ambient temperature;

a memory which receives a memory power supply voltage and stores a compensation signal according to characteristics of the plurality of pixels;

a driving controller which receives the first temperature signal from the temperature sensor, the second temperature signal from the temperature calculator, and an input image signal, and provides the display panel with an output image signal which is obtained by compensating for the input image signal based on the compensation signal from the memory; and a voltage generator which generates the memory power supply voltage in response to a voltage control signal from the driving controller, wherein the driving controller outputs the voltage control signal based on a temperature signal which indicates a lower temperature among the first temperature signal and the second temperature signal such that the memory power supply voltage has a first voltage level or a second voltage level, wherein the memory power supply voltage remains constant at the first voltage level such that a voltage level of the compensation signal output from the memory is within a normal range when the temperature signal is lower than or equal to a reference temperature, and wherein the memory power supply voltage remains constant at the second voltage level lower than the first voltage level when the temperature signal is higher than the reference temperature.

2. The display device of claim 1, wherein the pixel includes a transistor and a light emitting element electrically connected to the transistor, and wherein the compensation signal includes deterioration information of the transistor and the light emitting element.

3. A display device comprising:

a display panel including a plurality of pixels;

a main circuit board electrically connected to the display panel; and a driving circuit disposed on the main circuit board and providing an output image signal to the display panel, wherein the driving circuit includes:

a temperature sensor which detects an ambient temperature and outputs a first temperature signal corresponding to the detected ambient temperature;

a temperature calculator which calculates the ambient temperature using current flowing through a transistor included in the temperature calculator and outputs a second temperature signal corresponding to the calculated ambient temperature;

a memory which receives a memory power supply voltage and stores a compensation signal according to characteristics of the plurality of pixels;

a driving controller which receives the first temperature signal from the temperature sensor, the second temperature signal from the temperature calculator, and an input image signal, and outputs the output image signal to the display panel which is obtained by compensating for the input image signal based on the compensation signal from the memory; and a voltage generator which generates the memory power supply voltage in response to a voltage control signal from the driving controller, wherein the driving controller outputs the voltage control signal based on a temperature signal which indicates a lower temperature among the first temperature signal and the second temperature signal such that the memory power supply voltage has a first voltage level or a second voltage level, wherein the memory power supply voltage remains constant at the first voltage level such that a voltage level of the compensation signal output from the memory is within a normal range when the temperature signal is lower than or equal to a reference temperature, and wherein the memory power supply voltage remains constant at the second voltage level lower than the first voltage level when the temperature signal is higher than the reference temperature.

4. The display device of claim 3, wherein the pixel includes:

a light emitting element including a first terminal and a second terminal; and a transistor connected between a first voltage line and the first terminal of the light emitting element, and wherein the compensation signal includes deterioration information of the transistor and the light emitting element.

5. The display device of claim 4, wherein the voltage generator further generates a first driving voltage provided to the first voltage line and a second driving voltage provided to the second terminal of the light emitting element.

6. An operating method of a display device, the method comprising:

detecting a first ambient temperature and generating a first temperature signal corresponding to the detected ambient temperature;

calculating a second ambient temperature using current flowing through a transistor and generating a second temperature signal;

comparing a temperature signal which indicates a lower temperature from among the first temperature signal and the second temperature signal with a reference temperature;

generating a memory power supply voltage having a voltage level corresponding to the comparison result between the temperature signal and the reference temperature, wherein the memory power supply voltage remains constant at a first voltage level higher than a second voltage level such that a voltage level of the compensation signal output from a memory is within a normal range when the temperature signal is lower than or equal to the reference temperature;

providing the memory power supply voltage to the memory;

generating a compensation signal based on compensation information from the memory; and providing a display panel with an output image signal obtained by compensating for an input image signal based on the compensation signal, wherein the display panel includes a plurality of pixels, and wherein the memory stores the compensation information according to characteristics of the plurality of pixels.

7. The method of claim 6, wherein the generating of the memory power supply voltage includes:

when the temperature signal is higher than the reference temperature, outputting a voltage control signal of a first level; and outputting a first memory power supply voltage in response to the voltage control signal of the first level.

8. The method of claim 7, further comprising:

when the temperature signal is lower than or equal to the reference temperature, outputting the voltage control signal of a second level; and outputting the first memory power supply voltage of the first voltage level higher than the second voltage level in response to the voltage control signal of the second level.

9. The method of claim 6, wherein the pixel includes:

a light emitting element including a first terminal and a second terminal; and a transistor connected between a first voltage line and the first terminal of the light emitting element, and wherein the compensation information includes deterioration information of the transistor and the light emitting element.

* * * * *